United States Patent [19]

Schlesinger

[11] 3,774,236

[45] Nov. 20, 1973

[54] IMAGE CONVERTER UTILIZING THE COMBINATION OF AN ELECTROSTATIC DEFLECTION FIELD AND A MAGNETIC FOCUSING FIELD

[75] Inventor: Kurt Schlesinger, Fayetteville, N.Y.

[73] Assignee: General Electric Company, Owensboro, Ky.

[22] Filed: Nov. 29, 1971

[21] Appl. No.: 202,993

[52] U.S. Cl. .................... 315/11, 313/65
[51] Int. Cl. .................... H01j 29/41
[58] Field of Search .................... 315/10, 11, 12; 313/65

[56] References Cited

UNITED STATES PATENTS

| | | | |
|---|---|---|---|
| 2,997,614 | 8/1961 | Morton et al. | 315/10 |
| 2,863,087 | 12/1958 | Barbier | 315/11 |
| 3,324,329 | 6/1967 | Koda | 315/10 |

OTHER PUBLICATIONS

"Progress in the Development...of Electrostatic Deflection," Proceeding of IRE, Vol. 44, May 1956, Schlesinger.

"Internal Electrostatic Deflection Tales", Electronics, Vol. 25, July 1952.

*Primary Examiner*—Leland A. Sebastian
*Assistant Examiner*—J. M. Poten
*Attorney*—Nathan J. Cornfeld et al.

[57] ABSTRACT

An image converter tube is provided wherein a pattern of radiation falling on a photoconductive target leaves a corresponding pattern of conductivity which is used to modulate a floodbeam which irradiates the entire target. The modulated return beam returns through the same fields as the floodbeam. However, by combining an electrostatic deflection field with a magnetic focus field the return beam does not follow the same path as the forward beam, but impinges on a phosphor viewing screen adjacent the source of the floodbeam.

6 Claims, 2 Drawing Figures

IMAGE CONVERTER UTILIZING THE COMBINATION OF AN ELECTROSTATIC DEFLECTION FIELD AND A MAGNETIC FOCUSING FIELD

BACKGROUND OF THE INVENTION

This invention relates to image converter tubes, more particularly, to an image converter tube capable of converting invisible radiation into a visible image.

Image converter tubes usually contain a photocathode which is responsive to particular wavelengths of invisible radiation. Electrons emitted from the photocathode are ususally accelerated within the tube by suitable electron optics to impinge upon a phosphor screen to reproduce a visible light image of the original invisible radiation projected onto the photocathode. Such devices depend upon the availability of photocathode material responsive to the particular radiation to which it will be exposed. Furthermore, the amount of the radiation limits the quantity of photoelectrodes emitted from the photocathode. Therefore, direct acceleration of photoelectrons onto a phosphor viewing screen to produce a satisfactory light image is only possible when the radiation is of sufficient intensity to generate a satisfactory amount of photoelectrodes. For low levels of intensity other means such as charge storage means must be introduced adding to the complexity and cost of the device.

It is therefore an object of the invention to provide an image converter which operates without a photocathode. It is a further object of the invention to provide an image converter tube having a radiation sensitive target which is incapable of electron emission, i.e., "passive," but is responsive to the incoming radiation due to a capability of charge-image-formation in proportion to the spatial intensity-distribution of the radiation received. Such passive targets include photoconductive, photo-voltaic and doped-semiconductor materials. It is another object of the invention to provide an image converter tube having mixed field electron optics comprising magnetic focus means crossing electrostatic deflection means. Such crossed electromagnetic fields are non-reciprocating in that the path of an electron beam from the source toward the target is spatially separated from the return-beam being reflected from the target. These and other objects of the invention will be more readily apparent from a study of the detailed description and the drawings.

DESCRIPTION OF THE PREFERRED EMBODIMENT

Figure 1:
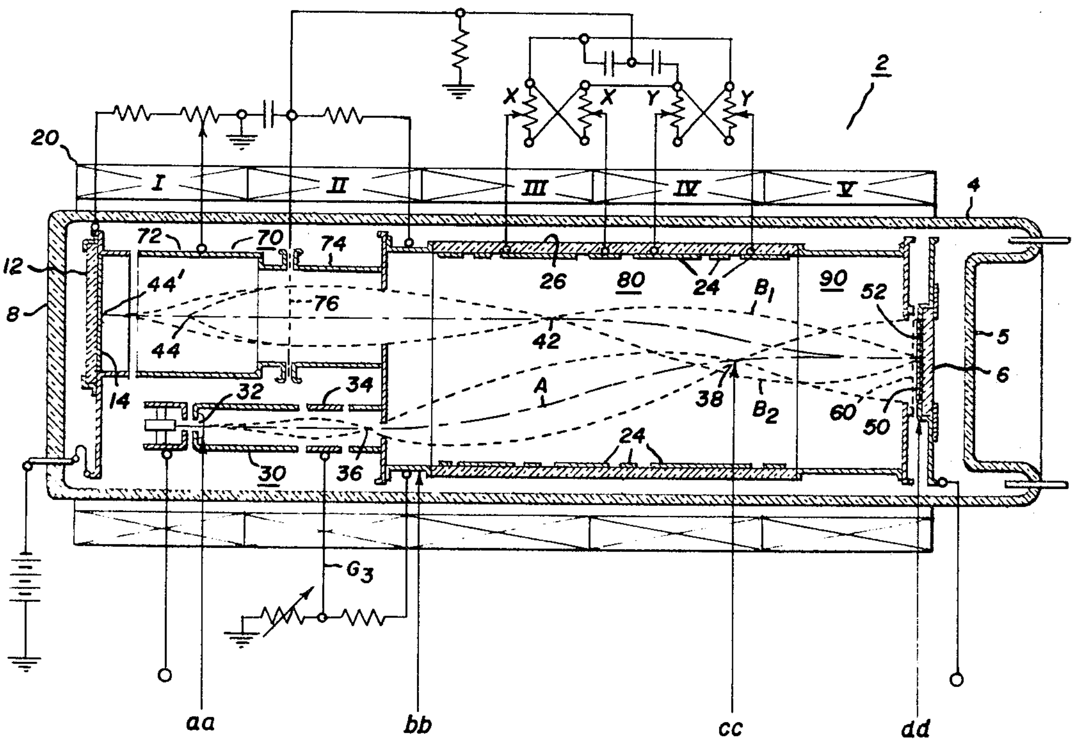
FIG. 1 is a horizontal, cross-sectional view of the tube of the invention.

Referring now to FIG. 1, an image converter tube constructed in accordance with the invention generally illustrated at 2 comprises a large glass cylinder 4 having a flat, transparent end wall 5 at one end thereof and a glass target support or faceplate 6 adjacent end wall 5. Deposited on the inner surface of faceplate 6 is a transparent, conductive coating 52 such as a tin oxide layer. Over this layer is placed a photoconductive layer 50 of a material such as $SbS_3$. Immediately adjacent photoconductive layer 50 is a screen or grid member 60.

At the opposite end of cylinder 4 is a second, transparent, end wall 8. Adjacent end wall 8 is a transparent support 12 for a phosphor viewing screen 14. Screen 14 displays an optical image of the radiation falling on faceplate 6 and photoconductor 50 in a manner which will be described below.

A floodgun 30 is also located within cylinder 4 adjacent end wall 8 to project a wide electron beam of about 45° to completely flood the surface of photoconductor 50. As will be more fully described with respect to the electron optics used in the image converter tube, the electron beam emanating from floodgun 30 is preferably focused to intersect photoconductor 50 at an anti-node so as to flood the entire surface.

The electron beams from floodgun 30, as well as the return beams from photoconductor 50 to viewing screen 14, are formed by mixed fields comprising coaxially placed windings 20 surrounding cylinder 4 and an electrostatic deflection system located within cylinder 4.

The electrostatic deflection system comprises, in the illustrated embodiment, two pairs of interleaved electrodes 24 coated on the inner surface of a support cylinder 26 which is explained more fully in my publications, "Internal Electrostatic Deflection Yokes," ELECTRONICS, Volume 25, pp 105–109, July 1952; and "Progress in the Development of Post Acceleration and Electrostatic Deflection," PROCEEDINGS OF THE IRE, Volume 44, pp 659–667, May 1956.

The electron beam emanating from floodgun 30 is thus influenced by a combination of crossed-electrostatic and magnetic fields. These mixed fields are set-up in the center of the tube, where the axial-magnetic field from solenoid 20 crosses the transverse-electric field of deflection electrodes 24. This combination can perform a parallactic offset of the beam, provided that the length of the cavity measures an integer number of nodal distances in the magnetic field. If this condition is met, the direction of the principal ray is conserved, as well as the angle subtended by the bundle of rays at each focus.

Accordingly, the principal ray A of the forward beam is shown as it leaves floodgun 30 parallel to axis. When this ray leaves the crossed-field volume or cavity 80 at focal point 38, it moves again in parallax, since the length ($l_c$) of the deflection electrodes 24 on support 26 measures just one focal length ($f$) in the case as shown, for example, ($f = 4$ inches). Similar conditions can also be realized for higher orders of focus, i.e., for: $f_K = 1/K \quad f_1$ where $K = 2, 3, 4$, etc.

The first order floodbeam A comes to a first focus at point Y. Since it leaves cavity 80 at this point, the principal ray A proceeds through the adjacent drift-space 90 parallel to axis. It now depends on the length ($l_d$) of the drift-space 90, how much of the target area can be "illuminated" by the floodbeam. To cover as large a target area as possible target 50 is placed into an anti-node, as shown in FIG. 1. This leads to: $l_d = 1/2 l_c = 2$ inches and to a throw of: $l_c + l_d = 3/2 l_c = 6$ inches from floodgun 30 to target 50 in the illustrated embodiment.

It is now possible to calculate the floodbeam-profile $2\alpha$ under the assumption that the envelope to a beam focused by a uniform magnetic field has sinusoidal shape. This leads to the equation:

$$\alpha=\tan^{-1}\frac{\pi K}{2}\cdot\frac{D_t}{l_c}$$

Here, $K$ is the mode-number, and $D_t$ is the useful target diameter. With $K = 1$, $D_t = 1$ inches and $l_c = 4$ inches we find: $\alpha = 21.3°$. Hence, the profile of floodbeam A should read almost 45°. A beam of this shape fills 0.5 steradian in space.

A floodgun generating this beam, therefore, must include a strong focusing lens, which can form a crossover from a large-diameter beam at short throw. To accomplish this floodgun 30 is constructed as a conventional CRT-triode with an object-aperature 32. This is followed at long distance, by a strong Einzel-lens 34. This combination generates at 36 a demagnified crossover which becomes the source of a floodbeam A whose profile is controlled by the $G_3-$ bias. Alternatively, a short focus-reflex type electron gun can be used such as the gun described and claimed in Schlesinger U.S. Pat. No. 2,995,676 and assigned to the assignee of this invention.

Thus floodbeam A floods the entire target 50 and is modulated by the charge image thereon. This modulated return beam may leave from any point on target 50 under the influence of an accelerating electric field between the target mesh 60 and the photoconductive target 50. In the process, each beamlet picks up intensity-modulation, and-or-directional modulation, depending on the point-by-point conditions encountered at the target surface. In the illustrated embodiment, a beam returning from target-center is shown by the profile ($B_1$–$B_2$). Its principal ray (B) re-enters the crossed-field cavity parallel to axis. Upon meeting the transverse electric field generated by deflection electrodes 24, this beam is deflected upwards, comes to a first-focus at point 42 midway within the cavity 80, and is then redirected into a parallax upon leaving the cavity.

It should be noted here that the dissimilar return path of electron beam B causing it to intersect screen 14 rather than return to floodgun 30 is a result of the mixture of a magnetic focus field and electrostatic deflection field rather than an all magnetic focus and deflection field. In an all magnetic field the return beam path would be a reciprocating path back to floodgun 30.

In field-free space, return-beam B would re-focus at 44, due to an extension of the solenoid 20 up to this point. Before reaching this second focus, however, the mangetic field strength decreases, and the beam encounters a post-accelerating electric field, giving rise to a zoom-lens 70 with variable magnification. Lens 70 comprises lens barrel 72, low voltage anode 74 and a separate mesh-electrode 76. The mesh-electrode has higher resolution (750 mesh per inch, 60 percent transmission) and its bias-voltage reads 10 percent lower than anode cylinder 74. The same "depressed" anode-voltage is imparted to the deflection electrodes 24 through the positioning controls (X) and (Y). Experience has shown that secondary emission from mesh 76 and from target-mesh 60 is negligible under these conditions.

In the illustrated embodiment, photoconductor 50 comprises antimony trisulfide. Depending upon the spectral response desired, other photoconductive materials such as; lead sulfide; lead selenide; lead telluride; tellurium; indium-antimonide; germanium doped with gold; germanium doped with copper, mercury, cadmium or zinc; or silicon doped materials.

As previously stated, return-beam B is modulated by the charge image on photoconductor 50. The resultant image on viewing screen 14 may be either a negative or positive image of the radiation pattern falling on photoconductor 50 depending upon the charge conditions on photoconductor 50.

This modulation, it is assumed, takes place either by electron-absorption, or by electron reflection. In the first case, the average target potential is brought up close to cathode potential. Now, floodbeam electrons are absorbed by positive target areas, and this causes a local decrease in return-beam density in the highlights. The result is a "negative" image of the subject matter.

By contrast, return-beam modulation by electron-reflection occurs if the target potential is slightly negative with respect to cathode. Now, floodbeam-electrons cannot penetrate into the target to be absorbed there. Instead, a process of "proximity focusing"takes place, whereby positive surface charges establish islands of converging lens action, thus causing local increases in current density of the reflected beam, and vice versa. The end-result is a "positive" display of surface detail on viewing screen. 14.

As previously stated coils 20 provide a magnetic focus field for beams A and B. In a preferred embodiment, the field is not uniform. This non-uniform field-configuration resulted from a search for an optimum focus-condition for this tube. Theoretical reasoning, confirmed by some experimental data, indicated that a perfectly uniform field is not necessarily the most suitable enviroment. Rather, best overall results are obtained with a particular kind of non-uniform field, as outlined below.

In the illustration, the tube is immersed within a solenoid which is wound in five separate sections I–V. The preferred ampere-turn distribution is as follows:

I—96
II—16
III—112
IV—207
V—207

As a result of this distribution, the axial field component $B_z$ averages more than twice as much in the deflection electrode-region, for example 35 Gauss, than it reads in the gun-and-screen region (18 Gauss). Assuming for the field-average in the cavity a value of 35 Gauss, we obtain, at a cavity-potential of 360 volt, a nodel separation of 4 ½inches. This agrees well with the desired mode of operation, as shown for the beams in dotted lines. A first crossover 36 occurs just inside the endplate of floodgun 30; a second focus 38 near the end of the crossed-field cavity, and a 20 mm-circle of irradiance in the plane of the target. The return-beam path including foc. 42, 44, and 44' is also shaped according to plan.

As stated above, the preferred magnetic field is not uniform. This is best brought out 1) by measurements of the radial field-component, and 2) by a plot of iron filings supported by an aluminum plate on axis of the solenoid. From such a plot it is evident, that the field is strong and almost perfectly uniform towards the target-end of the cavity. By contrast, the field is still uniform, but weak, in the gun and viewing section. Obviously, there must be strong radial fields present in the transition regions to satisfy the Laplace equation.

Figure 2:
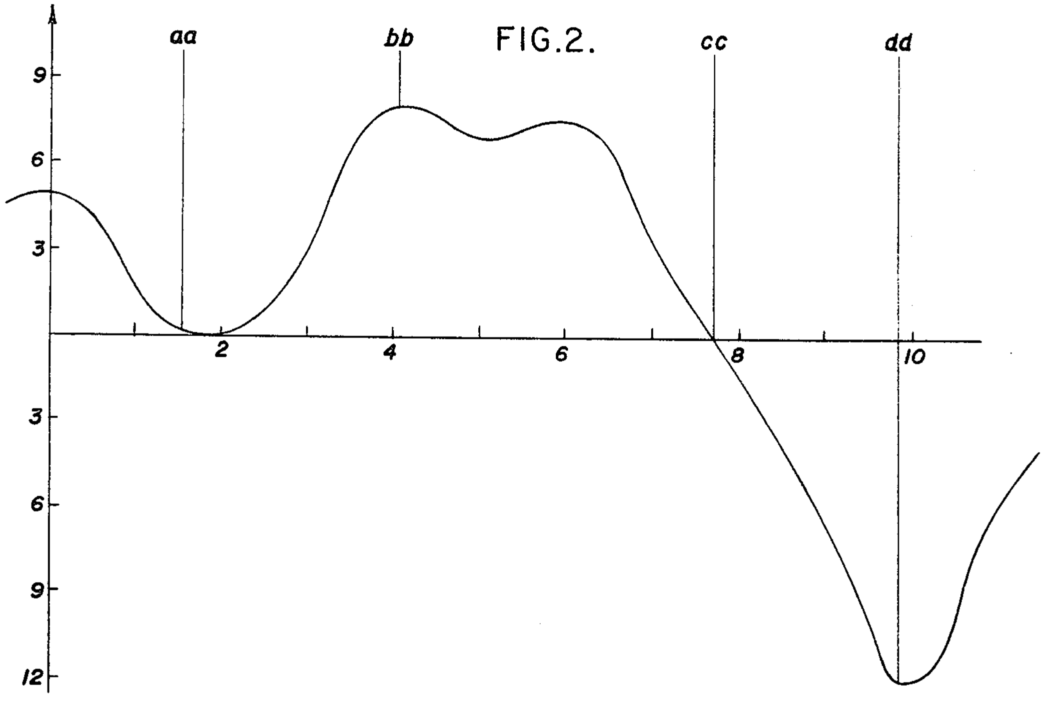
FIG. 2 is a plot of the magnetic field distribution within the tube.

These radial components are best studied with the aid of FIG. 2. Four plomb-lines (*aa*) through (*dd*) are traced to cross-reference the radial field with FIG. 1.

Line (*aa*) shows, that the object-sperture 32 in the gun lies in the same plane as one minimum of the radial field, i.e., in a field-section of almost "ideal" uniformity. This is a most desirable condition to launch a beam with a minimum of Larmor-precession, or "spin."

Line (*bb*) implies that there is a maximum-positive component of $B_r$ present from the first crossover 36 through most of cavity 80. From Busch's law it follows, that the beam will acquire an increasing amount of positive spin between 36 and 38.

Fortunately, the reference-line (*cc*) promises a spin-reversal at 38 since this point coincides with a second zero for $B_r$.

Thus, we find that the beam is being de-spun on its last leg from 38 to target 50. This is implied by the fact that the reference-line (*dd*) happens to reveal a coincidence between the target-plane in the gun, and a negative peak of the radial field in the coil.

In retrospect, then, this simple empirical approach points out that there are four specific cross sections in the gun assembly, where spatial correlation with the field-coil is important, both in the interest of best image quality, and of minimum rotational energy when landing on target.

At this point, it may be worthwhile to mention that target burn-in of an unusual kind had been observed at times during the development of this tube. In all cases, burns started at the perimeter, rather than in the center of the landing area, and proceeded from there in a tangential direction. This kind of mishap is due to the precessional component in the floodbeam. It became increasingly rare, however, after the preferred solenoid as described was used.

Thus, my invention provides a novel image converter tube whereby a radiation image on a photoconductor is converted to a visible image by a flood beam which travels from an electron gun to the photoconductor and back to a viewing screen through a common volume comprising mixed fields of electrostatic and magnetic components which cause the respective beams to travel in two different paths.

What I claim as new and desire to secure by Letters

Patent of the United States is:

1. An image converter tube comprising an elongated evacuated envelope defining an axis and containing a floodgun to generate a floodbeam of electrons, means establishing mixed electric and magnetic fields within a region within said envelope and comprising electrostatic deflection means and magnetic focus means to control said beam, said magnetic focus means providing a magnetic field having an axial component of intensity that varies along the axis of said tube, said electrostatic deflection means being supported within a predetermined portion only of the space occupied by said magnetic focus means, photoconductive means spaced from said floodgun and positioned to intersect said beam and to modulate said beam in response to a radiation image directed onto said photoconductive means, and viewing means positioned to intercept the modulated electron beam from the said photoconductive means and to convert said beam into a visible image.

2. The tube of claim 1 wherein said photoconductor is spaced from said floodgun a predetermined distance with respect to the strength of said mixed fields to intersect said floodbeam at an anti-node.

3. The tube of claim 1 wherein said viewing means are spaced from said photoconductor a predetermined distance with respect to the strength of said mixed fields which is slightly longer than the product of a whole number times the wavelength of said return beam.

4. The tube as defined in claim 1 wherein said region of mixed fields is characterized by a first end portion near said photoconductive means and a second end portion near said floodgun, and said magnetic field intensity is relatively strong toward said first end portion.

5. The tube as defined in claim 4 wherein said magnetic field intensity is relatively weak toward said second end portion.

6. The tube as defined in claim 1 wherein said magnetic focus means comprises an electromagnet having at least five sections coaxially aligned with each other and with the axis of said tube, the magnetic field intensity produced by individual ones of said sections being variable in a predetermined pattern.

* * * * *